United States Patent [19]

Fischer et al.

[11] Patent Number: 4,906,727
[45] Date of Patent: Mar. 6, 1990

[54] UREA-ALDEHYDE POLYCONDENSATES, PREPARATION THEREOF AND USE THEREOF AS SURFACE COATING BINDERS

[75] Inventors: Kurt Fischer, Ludwigshafen; Harro Petersen, Frankenthal; Hellmuth Kasch, Ludwigshafen; Horst Schmidt, Mannheim, all of Fed. Rep. of Germany

[73] Assignee: Basf Aktiengesellschaft, Ludwigshafen, Fed. Rep. of Germany

[21] Appl. No.: 130,678

[22] Filed: Dec. 9, 1987

[30] Foreign Application Priority Data

Dec. 9, 1986 [DE] Fed. Rep. of Germany ....... 3641997

[51] Int. Cl.$^4$ .............................................. C08G 12/12
[52] U.S. Cl. .................................... 528/230; 528/232; 528/239; 528/242; 528/259; 528/266; 528/488; 525/154
[58] Field of Search ............... 528/239, 232, 242, 259, 528/266, 488, 230; 525/154

[56] References Cited

U.S. PATENT DOCUMENTS 4,220,751  9/1980  Peterson et al. ..................... 528/232
4,243,797  1/1981  Peterson et al. ..................... 528/239
4,621,133  11/1986 Peterson et al. ..................... 528/239

*Primary Examiner*—John Kight
*Assistant Examiner*—S. A. Acquah
*Attorney, Agent, or Firm*—Keil & Weinkauf

[57] ABSTRACT

Urea-aldehyde polycondensates usable as surface coating binders are obtainable by step-wise reaction of
(a) urea and/or urea derivatives with acidic CH aldehydes in a molar ratio of urea:aldehyde of 1:2 in the presence of acids and at from 60° to 120° C. with
(b) a mixture of 3 moles of formaldehyde per mole or urea and 3 moles of an acidic CH aldehyde per mole of urea at from 60° to 120° C. with subsequent removal of the water of reaction and treatment of the reaction mixture with an alkali metal alcoholate at from 80° to 100° C.

6 Claims, No Drawings

UREA-ALDEHYDE POLYCONDENSATES, PREPARATION THEREOF AND USE THEREOF AS SURFACE COATING BINDERS

The present invention relates to a urea-aldehyde polycondensate obtainable by reaction of (a) 1 mole of a urea of the general formula (I)

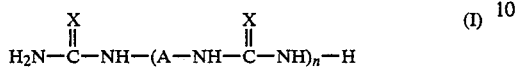

where X is oxygen or sulfur, A is $C_1$–$C_6$-alkylene, and n is from 0 to 3, with 1.9 (n+1) to 2.2 (n+1) moles of an aldehyde of the general formula (II)

where $R^1$ and $R^2$ are each hydrocarbyl of up to 20 carbon atoms, at from 60° to 120° C. in the presence of an acid and (b) subsequent reaction of the precondensate thus prepared with a mixture of from 2.8 to 3.2 moles of formaldehyde and from 2.8 to 3.2 moles of aldehyde (II), each per mole of urea (I), at from 60° to 120° C., (c) removal of water, and (d) further reaction of the resin thus obtained with an alkali metal alcoholate at from 80° to 100° C.

Acid-catalyzed condensation products of urea and aldehydes are known. For instance, European Patent Specifications 0,002,793 and 0,002,794 describe processes for preparing flexible and rigid resins from urea and acidic CH aldehydes by acid catalysis and by aftertreating the condensation products with bases in an anhydrous medium.

German Laid-Open Application DOS 3,425,131 describes a two-stage process for preparing urea-aldehyde polycondensates by reacting in the first stage, under acid catalysis, urea with an α,α-dialkylaldehyde in a molar ratio urea:aldehyde of 1:2 to give a 2-oxohexahydropyrimidine derivative, which in the second stage is condensed with a formaldehyde and one or more alcohols.

These condensation products are used individually or combined with physically drying binders such as cellulose derivatives, chlororubber, copolymers of vinyl ester, vinyl ether, vinyl chloride, aromatic vinyl or acrylate, or chemically drying binders, such as alkyd resins, drying and semidrying oils to produce surface coatings. The condensation products described above are readily soluble in solvents such as alcohols, ketones, esters and aromatic hydrocarbons, for example toluene and xylene. However, they are dilutable with aromatic-containing mineral spirits only to a limited extent (up to 1:1) and are virtually insoluble in aliphatic hydrocarbons.

In the development of environmentally acceptable surface coating systems, however, the use of aromatic-free solvents is desirable.

It is an object of the present invention to provide a urea-aldehyde condensation product which has unlimited solubility in aliphatic hydrocarbons and hence is suitable for producing environmentally acceptable surface coating systems.

We have found that this object is achieved by a urea-aldehyde polycondensate obtainable by reaction of (a) 1 mole of a urea of the general formula (I)

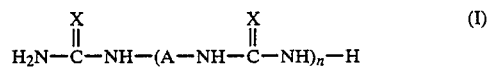

where X is oxygen or sulfur, A is $C_1$–$C_6$-alkylene, and n is from 0 to 3, with 1.9 (n+1) to 2.2 (n+1) moles of an aldehyde of the general formula (II)

where $R^1$ and $R^2$ are each hydrocarbyl of up to 20 carbon atoms, at from 60° to 120° C. in the presence of an acid and (b) subsequent reaction of the precondensate thus prepared with a mixture of from 2.8 to 3.2 moles of formaldehyde and from 2.8 to 3.2 moles of aldehyde (II), each per mole of urea (I), at from 60° to 120° C., (c) removal of water, and (d) further reaction of the resin thus obtained with an alkali metal alcoholate at from 80° to 100° C.

The present invention also provides a process for preparing said urea-aldehyde polycondensate and to the use thereof as a surface coating binder.

Suitable ureas of the general formula (I) are for example urea and thiourea when n is 0 and methylenediurea, ethylenediurea, tetramethylenediurea and hexamethylenediurea when n is 1, and mixtures thereof, urea being preferred.

Suitable aldehydes of the general formula (II) are for example isobutyraldehyde, 2-methylpentanal, 2-ethylhexanal and 2-phenylpropanal and mixtures thereof, isobutyraldehyde being preferred.

Formaldehyde can be used in aqueous form or as paraformaldehyde.

Suitable acids for the condensation reaction are customary inorganic and organic acids such as hydrochloric acid, sulfuric acid, nitric acid, oxalic acid and p-toluenesulfonic acid, sulfuric acid being preferred.

The process according to the invention is preferably carried out in the presence of a solvent and/or diluent. Suitable solvents are in particular aromatic hydrocarbons such as toluene and xylene.

To carry out the process according to the invention, a cyclocondensation reaction is carried out in a first stage to combine urea (I) and aldehyde (II) in a molar ratio of from 1:1.9 to 1:2.2, preferably 1:2, in the presence of an acid at from 60° to 120° C., preferably from 80° to 85° C., and with a residence time of from 1 to 2 hours, to form a 2-oxohexahydropyrimidine derivative. If the urea:aldehyde molar ratio is very different from 1:2, the products formed in the second condensation stage are insoluble in aliphatic hydrocarbons.

To the 2-oxohexahydropyrimidine derivatives are added in a second stage from 2.8 to 3.2 moles, preferably 3 moles, of formaldehyde per mole of urea and from 2.8 to 3.2, preferably 3, moles of aldehyde (II) and condensed therewith at from 60° to 120° C., preferably from 80° to 90° C., in the course of from 1 to 2 hours.

The molar ratio urea:formaldehyde:aldehyde (II) is then 1:2.8–3.2:4.7–5.4, preferably 1:3:5, which is essential for the solubility of the condensation products according to the invention in aliphatic hydrocarbons.

After the acid condensation has ended, the aqueous phase is separated off, if desired after addition of solvent, preferably xylene, and any water still present is removed by azeotropic distillation. Thereafter, from 2 to 6% by weight, based on the condensation product, of an alkali metal alcoholate, preferably sodium methylate, are added, and the mixture is heated at from 80° to 100° C. for from 1 to 2 hours. This is followed by a neutralization with an inorganic or organic acid, for example with sulfuric acid, phosphoric acid or oxalic acid, the salt is washed with water, and the condensation product dissolved in the organic solvent phase is freed from solvent by distillation under reduced pressure.

The process according to the invention can be carried out continuously or batchwise.

The condensation products according to the invention show unlimited solubility not only in the solvents and diluents customary in surface coating technology, such as alcohols, ketones, esters and aromatic hydrocarbons, but also in aliphatic hydrocarbons.

Combined with other film formers customarily to be used as surface coating binders, such as cellulose derivatives, chlororubber, copolymers of vinyl ester, vinyl ether, vinyl chloride, acrylate or aromatic vinyl, such as vinyl chloride, vinyl isobutyl ether copolymers or chemically drying binders, such as alkyd resins, drying and semidrying oils, they are suitable for producing surface coatings, in which the condensation product content is variable within wide limits, but in most cases is not more than 50, preferably 2 to 35, % by weight of the total binder.

They can also be used as binders in appropriate plasticizer combinations for producing overlay or protective coatings.

The surface coating binders according to the invention are suitable for application by customary methods such as brushing, spraying or casting for producing surface coats on substrates such as metal, wood, chipboard and paper. They have very advantageous processing properties. The surface coats obtained show very good mechanical properties, good gloss, outstanding lightfastness, good resistance to heat yellowing and good water resistance.

EXAMPLE 1

In a reaction vessel 360 g (5 mol) of isobutyraldehyde and 150 g (2.5 mol) of urea were heated to 60° C., and 250 g of 50% strength by weight sulfuric acid were added in the course of 10 minutes. The mixtures was heated to 80° C. and stirred at that temperature for 1 hour. This was followed by cooling down to 50° C., addition of 563 g (7.5 mol) of 40% strength by weight formaldehyde and 540 g (7.5 mol) of isobutyraldehyde, and further stirring at 80° C. for 3 hours. After 800 g of xylene had been added, the aqueous phase was separated off. The xylene phase was stripped of residual water by azeotropic distillation at 50° C. and 50 mbar, and 90 g of 30% strength by weight sodium methylate solution were added andstirred in at from 90° to 95° C. for 1 hour. This was followed by cooling down to 70° C., neutralizing with 75% strength by weight sulfuric acid and 2 washes with 500 g of water each time. The xylene phase was evaporated in a thin-film evaporator at from 180° to 185° C. and 5 mbar to leave 832 g of a slightly yellow condensation product having a softening point, by German Standard Specification DIN 53,180, of about 85° C.

| Acid number (DIN 53,401) | <5 |
| Color number (DIN 6,162) | <2 |
| Non-volatile constituents (2 hours at 125° C.) | >98% |

The condensation product gives clear and infinitely dilutable solutions in aromatic-free petroleum hydrocarbons, such as petroleum spirits (boiling range from 90° to 100° C.) and special distillates having boiling ranges from 60° to 95° C. and from 155° to 170° C.

EXAMPLE 2

Continuous method of preparation

The first flask of a laboratory cascade comprising three 1 liter flasks connected in series was continuously charged with 88 g/h of 50% strength by weight aqueous urea solution, 106 g/h of isobutyraldehyde and 75 g/h of 50% strength by weight sulfuric acid via metering pumps while the temperature was maintained at from 80° to 85° C. The residence time in the first flask was about 1.4 hours. In the second flask of the cascade, 165 g/h of 40% strength by weight aqueous formaldehyde solution and 159 g/h of isobutyraldehyde were metered in at from 85° to 90° C. In the third cascade stage, the condensation was completed at 90° C. The total residence time in the cascade was about 4.3 hours.

The reaction product obtained out of the cascade in the course of 5 hours was dissolved in 1,300 g of xylene and, after the aqueous phase had been separated off by azeotropic distillation as described in Example 1, freed from residual water. 132 g of 30% strength by weight sodium methylate solution were then added and stirred in at 90° C. for 1 hour. The reaction mixture was cooled down to 70° C., brought to pH 4.5–5 with about 40 g of 75% strength by weight sulfuric acid and washed twice with 750 g of water each time at from 70° to 80° C. The solvent was distilled off in a thin-film evaporator at from 180° to 185° C. and 5 mbar.

The result obtained was 1,194 g of a pale condensation product having a softening point, as defined in German Standard Specification DIN 53,180, of 83° C.

| Acid number (DIN 53,401) | <5 |
| Color number (DIN 6,162) | <2 |
| Non-volatile constituents (2 hours at 125° C.) | >98% |

EXAMPLE 3

Yellowing-resistant paint based on a long-oil, fatty acid modified alkyd resin 44 g of an alkyd resin based on low-resin tall oil fatty acid, 60% strength in mineral spirits (oil length 66%),
6.6 g of resin according to Example 1 or 2,
3.0 g of dimethyldioctadecylammonium bentonites (anti-settling agent), 10% strength in xylene,
0.5 g of silicone oil, 10% strength in toluene (flow control agent),
0.4 g of methyl ethyl ketoxime (skin prevention agent),
1.0 g of fixative (11.5% of Co, 1.5% of Mn, 22% of Pb) 50% strength in mineral spirits,
30.0 g of titanium dioxide RN 56 and 14.5 g of mineral spirits were mixed at room temperature in a stirred vessel. The paint had a solids content of 64% by weight and was applied by means of a brush to wood or metal.

The paint film obtained showed high gloss and excellent lightfastness.

EXAMPLE 4

Yellowing-resistant overlay coating based on a long-oil soya alkyd resin 46 g of soya oil alkyd resin, 75% strength in mineral spirits (oil length 63%),
10 g of resin according to Example 1 or 2,
0.4 g of cobalt naphthenate containing 6% of cobalt,
0.6 g of lead naphthenate, containing 24% of lead,
2.0 g of calcium octoate containing 4% of calcium and
41 g of mineral spirits were mixed at room temperature in a stirred vessel to give 100 g of a coating having a solids content of 44.5%.

On application to wood or metal by spray gun the coating showed very good lightfastness and high gloss.

We claim:

1. A urea-aldehyde polycondensate obtained by
(a) the cyclocondensation reaction of 1 mole of a urea of the formula (I)

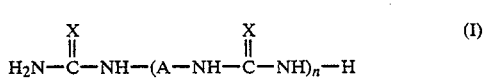

where X is oxygen or sulfur, A is $C_1$–$C_6$-alkylene, and n is from 0 to 3, with 1.9 (n+1) to 2.2 (n+1) moles of an aldehyde of the formula (II)

where $R^1$ and $R^2$ are each hydrocarbyl of up to 20 carbon atoms, at from 60° to 120° C. in the presence of an acid to form a 2-oxohexahydropyrimidine derivative, and
(b) the subsequent reaction of the 2-oxohexahydropyrimidine derivative with a mixture of from 2.8 to 3.2 moles of formaldehyde and from 2.8 to 3.2 moles of aldehyde (II), each per mole of urea (I), at from 60° to 120° C.,
(c) the removal of water, and
(d) the further reaction of the resin thus obtained with an alkali metal alcoholate at from 80° to 100° C.

2. A urea-aldehyde polycondensate as defined in claim 1, and obtained by using urea, thiourea, methylenediurea or hexamethylenediurea as a urea of the formula (I).

3. A urea-aldehyde polycondensate as defined in claim 1, and obtained by using isobutyraldehyde, 2-methylpentanal, 2-ethyl-hexanal or 2-phenylpropanal as the aldehyde (II).

4. A process for preparing a urea-aldehyde polycondensate as defined in claim 1, which comprises reacting
(a) 1 mole of a urea of the formula (I)

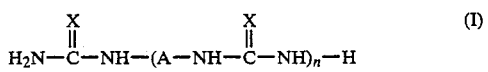

where X is oxygen or sulfur, A is $C_1$–$C_6$-alkylene, and n is from 0 to 3, with 1.9 (n+1) to 2.2 (n+1) moles of an aldehyde of the formula (II)

where $R^1$ and $R^2$ are each hydrocarbyl of up to 20 carbon atoms, at from 60° to 120° C. in the presence of an acid and reacting the precondensate thus prepared
(b) with a mixture of from 2.8 to 3.2 mole of formaldehyde and 2.8 to 3.2 moles of aldehyde (II), each per mole of urea (I), at from 60° to 120° C.,
(c) removing the water and
(d) further reacting the resin thus obtained with an alkali metal alcholate at from 80° to 100° C.

5. A surface coating or binder containing a urea-aldehyde polycondensate as defined in claim 1.

6. A urea-aldehyde polycondensate as defined in claim 1, wherein the molar ratio of urea:formaldehyde:aldehyde (II) in step (b) is 1:2.8–3.2:4.7–5.4.

* * * * *